United States Patent [19]
Iwasa et al.

[11] Patent Number: 4,864,451
[45] Date of Patent: * Sep. 5, 1989

[54] FLEXIBLE DISK JACKET

[75] Inventors: Masakazu Iwasa; Kazuhiko Morita, both of Kanagawa, Japan

[73] Assignee: Fuji Photo Film Co., Ltd., Kanagawa, Japan

[*] Notice: The portion of the term of this patent subsequent to Feb. 21, 2006 has been disclaimed.

[21] Appl. No.: 89,004

[22] Filed: Aug. 20, 1987

Related U.S. Application Data

[63] Continuation of Ser. No. 660,985, Oct. 15, 1984, abandoned.

[30] Foreign Application Priority Data

Oct. 21, 1983 [JP] Japan .......................... 58-163185[U]

[51] Int. Cl.⁴ ..................... G11B 23/033; B65D 85/30
[52] U.S. Cl. .................................... 360/133; 206/444
[58] Field of Search ............... 360/133, 132, 135, 137; 206/444; 428/35

[56] References Cited

U.S. PATENT DOCUMENTS

| | | | |
|---|---|---|---|
| 4,251,843 | 2/1981 | Masuyama et al. | 360/137 |
| 4,413,298 | 11/1983 | Pecsok et al. | 360/133 |
| 4,479,579 | 10/1984 | Miklos | 360/133 |
| 4,485,421 | 11/1984 | Hoshino | 360/133 |
| 4,501,357 | 2/1985 | Park | 206/444 |
| 4,510,546 | 4/1985 | Asami et al. | 360/135 |

FOREIGN PATENT DOCUMENTS 53-110514  9/1978  Japan .................................. 360/133

OTHER PUBLICATIONS

BYTE Publications Inc., vol. 8, No. 9, Sep. 1983, p. 160, advertisement.

*Primary Examiner*—John H. Wolff
*Assistant Examiner*—Matthew J. Bussan
*Attorney, Agent, or Firm*—Gerald J. Ferguson, Jr.

[57] ABSTRACT

A flexible disk jacket for accommodating therein a disk-like magnetic recording medium to form a flexible disk is formed by folding and bonding a plastic sheet into a bag-like shape. The plastic sheet is of a composite sheet material formed by laminating an outer layer and an inner layer respectively consisting of at least one plastic layer. The outer layer is colored and has heat sealability and antistatic properties. The inner layer has heat sealability.

6 Claims, 1 Drawing Sheet

FLEXIBLE DISK JACKET

This application is a continuation of Ser. No. 660,985, filed 10/15/84, now abandoned.

BACKGROUND OF THE INVENTION

1. Field of the Invention

This invention relates to a flexible disk jacket for accommodating therein a disk-like magnetic recording medium to form a flexible disk sometimes referred to as a "floppy disk" or "diskette".

2. Description of the Prior Art

As shown in FIG. 1, conventional flexible disks comprise a casing (generally referred to as a "flexible disk jacket") and a disk-like magnetic recording medium 2 accommodated therein for rotation. The flexible disk jacket is formed by folding a plastic sheet 1 such as of polyvinyl chloride (PVC), polycarbonate, polyethylene terephthalate (PET) or the like into a bag-like shape. The recording medium 2 comprises a flexible base sheet which is circular in shape and bears a magnetic recording layer on one side or both sides thereof. To the inner surface of the jacket is attached a liner 3 formed of unwoven fabric, for instance, in order to protect the recording medium 2, reduce rotational torque of the recording medium 2 and clean the surfaces of the same.

When manufacturing the flexible disk jacket, a blank of a predetermined shape is stamped out from a sheet material and then said liner 3 is bonded to the blank by thermolaminating. The resulting laminate is folded, with heat applied to the portions to be bent, and formed into a bag-like shape by heat sealing, ultrasonic sealing or the like.

Therefore, the plastic sheet 1 must have heat sealability. Further, the plastic sheet 1 must be resistant to heat produced when the flexible disk is driven by the recording/reproducing system. The plastic sheet 1 must be dimensionally stable and is preferred to have high scratch resistance.

That is, the plastic sheet 1 must withstand temperatures of up to 80° C. without significant heat deformation or deformation due to heat shrinkage. Further, two parts of the plastic sheet 1 must be heat-sealable together at a temperature between 100° C. and 300° C. with a sufficient bonding strength, and the liner 3 of such as unwoven fabric of rayon/propylene resin or polyester resin must be heat-sealable to the plastic sheet 1 at a temperature in the same range with a sufficient bonding strength.

Conventional flexible disk jackets are generally colored substantially in achromatic color, e.g., black or other dark color. This is because carbon is added to the plastic sheet 1 as an antistatic agent. When the jacket is electrostatically charged, dust is attracted thereto to cause drop-out upon recording or reproduction or to cause the surface of the recording medium 2 to be scratched.

Carbon is advantageous over other antistatic agents in that it can, in small amounts, reduce the electrical resistance of polyvinyl chloride without adversely affecting the properties of the polyvinyl chloride, an inexpensive and easy-to-process material that is widely used for the plastic sheet 1 in producing the jacket. Furthermore carbon itself is inexpensive and stable and does not adversely affect the magnetic recording medium 2.

However, there is a demand for flexible disk jackets colored in various fresh chromatic colors as such flexible disks would be more attractive in appearance and could be easily separated by color. Further, flexible disk jackets of dark color are disadvantageous in that any fingerprints are clearly visible. In order to color the flexible disk jacket in a fresh chromatic color, a colorless or thin white antistatic agent must be used. However, such antistatic agents are apt to exude from the surface of the jacket to be transferred to the surface of the recording medium, thereby adversely affecting the properties and durability of the recording medium, and at the same time the electric resistance of such antistatic agents is apt to change with time depending on the storage conditions.

Further, sometimes, the flexible disk jacket must have light-shielding properties.

In short, there has been developed no plastic sheet material which can satisfy all the requirements for the flexible disk jacket.

SUMMARY OF THE INVENTION

In view of the foregoing observations and description, the primary object of the present invention is to provide an improved structure of the flexible disk jacket which permits the flexible disk jacket to be colored in fresh chromatic color without adversely affecting other various properties of the flexible disk jacket.

In accordance with the present invention, the flexible disk jacket is formed by folding and bonding a composite plastic sheet material comprising an outer layer and an inner layer, the outer layer being colored in chromatic color and having heat sealability and antistatic properties, and the inner layer having heat sealability.

In one preferred embodiment of the present invention, the outer surface of the outer layer is grained so as to resist marking with fingerprints.

With the arrangement of the present invention, the various requirements for the flexible disk jacket may be shared between the two layers and therefore can be satisfied relatively easily.

DESCRIPTION OF THE PREFERRED EMBODIMENT

Figure 1:
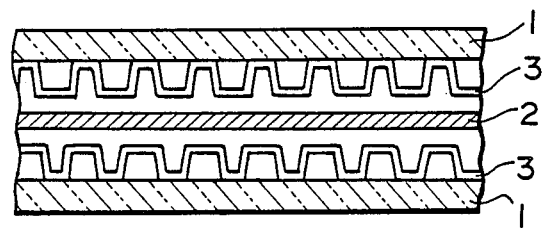
FIG. 1 is a fragmentary cross-sectional view of a flexible disk having a flexible disk jacket in accordance with the prior art, and FIG. 2. is a fragmentary cross-sectional view of a flexible disk having a flexible disk jacket in accordance with an embodiment of the present invention.
Figure 2:
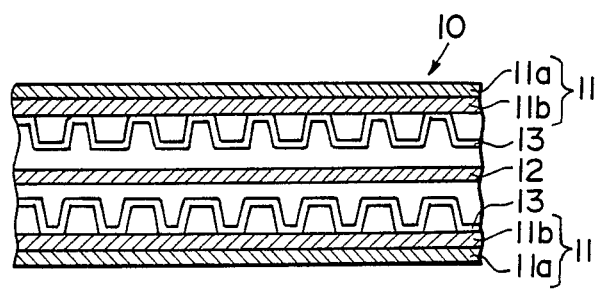

In FIG. 2, a flexible disk jacket 10 in accordance with an embodiment of the present invention accommodates therein for rotation a disk-like magnetic recording medium 12 comprising a flexible base sheet which is circular in shape and bears a magnetic recording layer on one side or both sides thereof. The flexible disk jacket 10 comprises a bag-like plastic sheet 11 and a liner 13 which is formed of, for instance, unwoven fabric, and is attached to the inner surface of the plastic sheet 11. The plastic sheet 11 is of a composite plastic sheet material formed by laminating an outer layer 11a and an inner layer 11b. The outer layer 11a and the inner layer 11b may be respectively of a plurality of plastic layers, if desired. The outer layer 11a is colored and has heat sealability and antistatic properties. The inner layer 11b has heat sealability. The composite sheet material is folded and sealed along the side edges by heat sealing, ultrasonic sealing or the like into a bag-like shape.

As the basic polymer of the outer layer 11a, various resins such as vinyl chloride homopolymer, vinyl chloridevinyl acetate copolymer, PET, polycarbonate, polyimide, polyamide, polyester, polystyrene, polyvinylidene chloride, styrene-butadiene copolymer, polyethylene, polypropylene, cellulose acetate, polyvinylidene fluoride and acrylonitrile-stylene-butadiene copolymer can be used.

To the basic polymer are added known additives, stabilizers, and modifiers. For example, when vinyl chloride homopolymer or vinyl chloride-vinyl acetate copolymer is used as the basic polymer, ABS/MBS modifier, octyl tin stabilizer and montan wax additives may be added.

As the additive for reducing the electric resistance of the outer layer 11a, various known antistatic agents such as inorganic additives like tin oxide, anionic antistatic agents, cationic antistatic agents, amphoteric antistatic agents, and neutral antistatic agents can be used. In order to provide light shielding properties, inorganic pigments such as carbon, graphite, titanium oxide and red oxide, or dyes having absorption band in the visible region can be added to the inner layer 11b.

In order to color the outer layer 11a, the following pigments, blended with suitable stabilizers and the like if desired, may be used:

yellow-orange pigments—chrome yellow pigment, zinc yellow, cadmium yellow, Hansa yellow, flavanthrone yellow, benzidine yellow, molybdate orange, yellow oxide, and benzidine orange;

red pigments—red oxide, thioindigo, cadmium red, anthraquinone red, quinacridone red, and chromium tin;

blue-green-violet pigments—phthalocyanine blue, phthalocyanine green, indanthrene blue, chrome oxide green, cobalt green and violet oxide;

white pigments—titanium oxide, zinc oxide, zinc sulfide, and white lead.

In order to prevent the outer surface of the outer layer 11a from being marked with fingerprints, and to improve the scratch resistance of the same, it is preferred that modifier be added to the outer layer 11a and at the same time the outer layer is grained by, for instance, the embossing or sand mat process.

The inner layer 11b is provided with a layer of hot-melt adhesive or a layer of polymer which is the same as the polymer of the outer layer 11a, whereby the inner layer 11b is given heat sealability.

Generally, it is preferred that the basic polymers for the outer layer 11a and the inner layer 11b be the same from the viewpoint of adherence and dimensional stability. However, different basic polymers may be bonded together by coating, lamination, or co-extrusion. The basic polymer and the additives of the outer layer 11a should be carefully selected so that when the composite plastic sheet 11 is folded into a bag-like shape, the folded portion does not craze.

Since, the main purpose of the inner layer 11b is to provide heat sealability to the flexible disk jacket 10, the inner layer 11b may be thinner than the outer layer 11a so that heat resistance and dimensional stability of the entire jacket 10 are sustained by the outer layer 11a.

We claim:

1. A flexible disk jacket or a flexible disk formed by folding and bonding a plastic sheet to itself into a bag-like shape wherein said plastic sheet comprises an outer layer and an inner layer bonded together, the outer and inner layers respectively consisting of at least one plastic layer, the outer layer being colored by pigments selected from the group consisting of yellow-orange pigments, red pigments, blue-green-violet pigments and white pigments by at least one pigments selected from the group consisting of chromatic color pigments and white pigments and having heat sealability to said inner layer and antistatic properties, and the inner layer having a layer of adhesive, whereby the inner layer has heat sealability to said outer layer.

2. A flexible disk jacked as defined in claim 1 in which the outer surface of the outer layer is grained.

3. A flexible disk jacket as defined in claim 1 in which the inner layer has light shielding properties provided by the addition to said inner layer of at least one inorganic pigment selected from the group consisting of carbon, graphite, titanium oxide and red oxide, or dyes having an absorption ban in the visible range.

4. A flexible disk jacket for a flexible disk formed by folding and bonding a plastic sheet to itself into a bag-like shape wherein said plastic sheet comprises an outer layer and an inner layer bonded together, the outer and inner layers respectively consisting of at least one plastic layer, the outer layer being colored by at least one pigment selected from the group consisting of chromatic color pigments and white pigments and having heat sealability to said inner layer and antistatic properties, and the inner layer having a layer of polymer which is the same as the polymer of the outer layer, whereby the inner layer has heat sealability to said outer layer.

5. A flexible disk jacket as defined in claim 4 in which the outer surface of the outer layer is grained.

6. A flexible disk jacket as defined in claim 4 in which the inner layer has light shielding properties provided by the addition to said inner layer of at least one inorganic pigment selected from the group consisting of carbon, graphite, titanium oxide and red oxide, or dyes having an absorption ban in the visible range.

* * * * *